United States Patent
Molina et al.

(10) Patent No.: US 9,418,117 B1
(45) Date of Patent: *Aug. 16, 2016

(54) DISPLAYING RELEVANT MESSAGES OF A CONVERSATION GRAPH

(71) Applicant: Twitter, Inc., San Francisco, CA (US)

(72) Inventors: Marcel Molina, San Francisco, CA (US); Ross Cohen, San Francisco, CA (US); Kyle Maxwell, San Francisco, CA (US); Stuart Hood, San Francisco, CA (US); Cara Meverden, San Francisco, CA (US); Coleen Baik, San Francisco, CA (US); Arya Asemanfar, San Francisco, CA (US); Erin Moore, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/020,447

(22) Filed: Sep. 6, 2013

Related U.S. Application Data

(63) Continuation-in-part of application No. 13/770,955, filed on Feb. 19, 2013, which is a continuation-in-part of application No. 13/736,634, filed on Jan. 8, 2013, now Pat. No. 9,143,468.

(51) Int. Cl.
*G06F 17/30* (2006.01)

(52) U.S. Cl.
CPC .................................. *G06F 17/3053* (2013.01)

(58) Field of Classification Search
USPC ........... 707/728; 709/206, 204; 715/781, 858, 715/764, 709, 751, 745
See application file for complete search history.

(56) References Cited

U.S. PATENT DOCUMENTS

| | | | |
|---|---|---|---|
| 6,631,351 B1* | 10/2003 | Ramachandran et al. ..... 704/270 |
| 7,546,131 B1* | 6/2009 | Sidi ...................... G06Q 10/107 455/466 |
| 7,752,649 B1* | 7/2010 | Harvey .................. G01R 1/071 370/486 |
| 7,830,925 B1* | 11/2010 | Harvey .............. G06Q 30/0251 370/509 |
| 9,143,468 B1* | 9/2015 | Cohen .................... H04L 51/00 |
| 2008/0012701 A1 | 1/2008 | Kass et al. |
| 2009/0234924 A1* | 9/2009 | Edelen et al. ................. 709/206 |
| 2009/0313346 A1 | 12/2009 | Sood |
| 2010/0273443 A1* | 10/2010 | Forutanpour et al. ....... 455/404.1 |
| 2012/0240062 A1* | 9/2012 | Passmore et al. ............. 715/758 |

OTHER PUBLICATIONS

Notice of Allowance received for U.S. Appl. No. 13/770,955, mailed on Feb. 10, 2016, 10 pages.

* cited by examiner

*Primary Examiner* — Jude Jean Gilles

(57) ABSTRACT

A method, system, and non-transitory computer readable medium for displaying relevant messages of a conversation graph. A reverse chronological stream of messages broadcasted to a recipient account of a messaging platform is received. The set of authoring accounts having a predefined graph relationship with the recipient account. Among the stream of messages, a message determined to be a part of a relevant conversation is identified. Additional content associated with the conversation is then inserted into the stream. A client displaying the stream displays the conversation related content with one or more display elements depicting relationships among messages of the conversation.

24 Claims, 20 Drawing Sheets

| * | Message ID 302 | Author Account ID 304 | Message Content 306 | Relevant Participant(s) Account ID 308 | In Reply to 310 |
|---|---|---|---|---|---|
| 312 | 1 | @adam | I hate football | none | none |
| 314 | 2 | @joseph | @adam real talk | @adam | 1 |
| 316 | 3 | @brian | @adam @joseph How can you say that? | @adam, @joseph | 2 |
| ... | ... | ... | ... | ... | ... |

Message Table 300

Account Data Table
400

| * | Account ID 402 | Display Name 404 | Followed By 406 |
|---|---|---|---|
| 410 | @keith | Keith Jones | @brian |
| 412 | @adam | Adam Doe | @brian, @carrie, @david, @joseph |
| 414 | @carrie | Carrie Barnes | @brian, @adam |
| 416 | @david | David Swenson | @brian, @john |
| 418 | @brian | Brian James | @david, @adam, @carrie, @keith |
| 420 | @whatsupxxx | What's Up Marketing, LLC | @adam, @george, @paul |
| 422 | @joseph | Joseph Lauer | @adam, @ashish, @brian |
| 424 | @ashish | Ashish Pahal | @john, @carrie |

Figure 4

Most recent message has prominence, while still providing context
Figure 15

- An affordance to access activity/branches around a root tweet
- Avatars and/or names, rather than just counts
- Redundancy: "Happy Birthday" case is redundant
- Associates tweets in the same conversation together
- Facepile has a visual indication of the root
- Reduces redundancy by only showing the most recent in reply
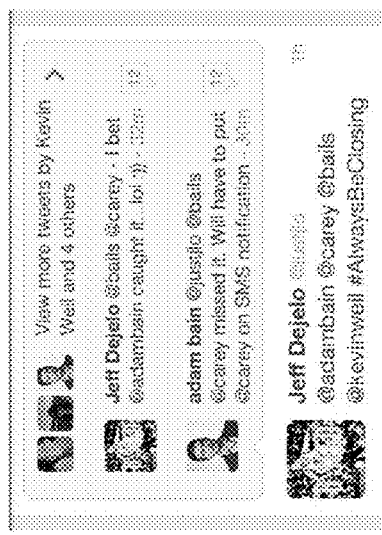
Figure 16

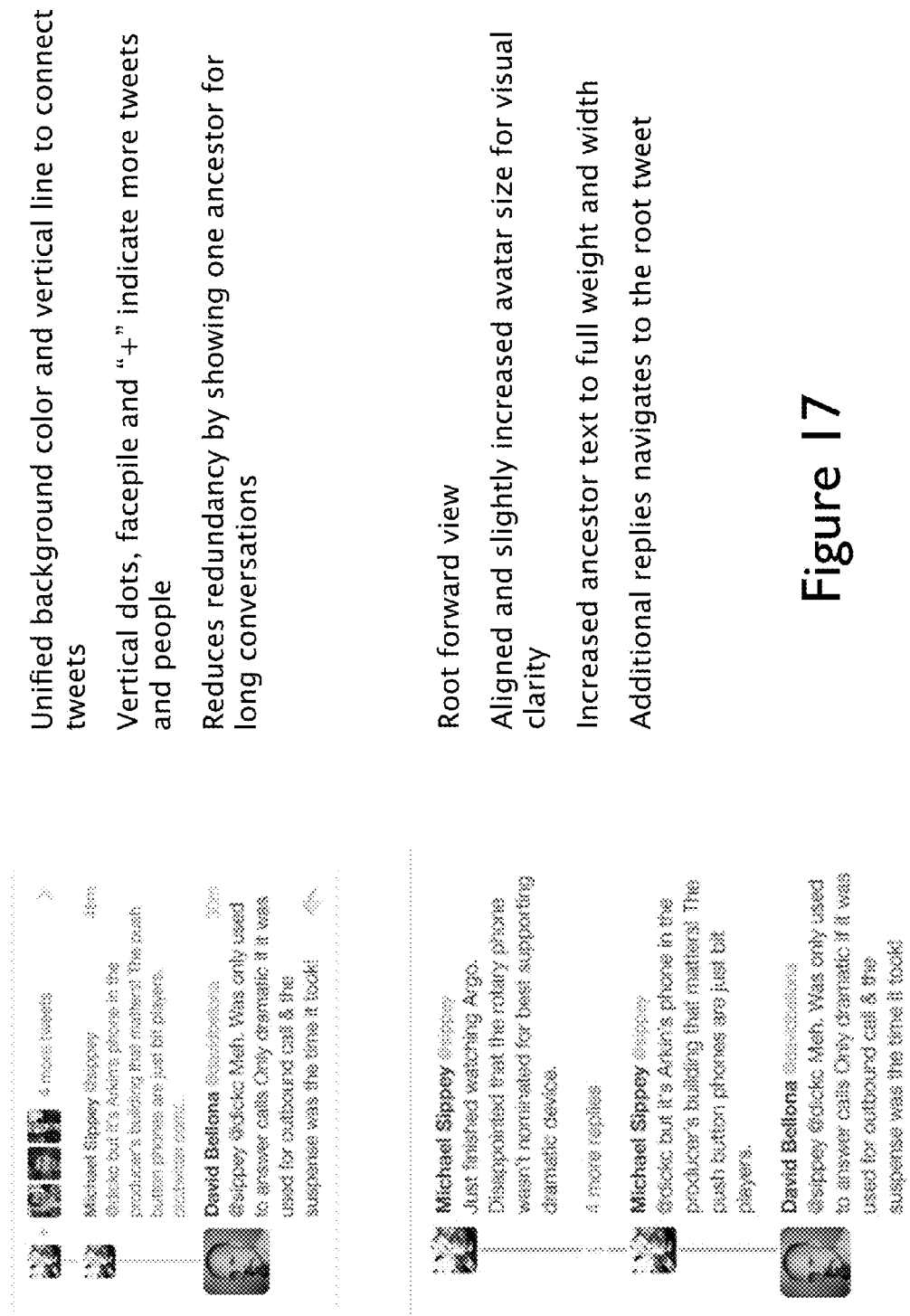

Figure 17

- Unified background color and vertical line to connect tweets
- Vertical dots, facepile and "+" indicate more tweets and people
- Reduces redundancy by showing one ancestor for long conversations
- Root forward view
- Aligned and slightly increased avatar size for visual clarity
- Increased ancestor text to full weight and width
- Additional replies navigates to the root tweet Most recent Tweet has prominence, while still providing context A clear affordance to access all activity/branches around a root tweet Associates tweets in the same conversation together Root forward design Reduces redundancy by only showing the most recent in reply Visual clarity Meets user expectations for home timeline

Figure 18

DISPLAYING RELEVANT MESSAGES OF A CONVERSATION GRAPH

CROSS-REFERENCE TO RELATED APPLICATIONS

This application is a continuation-in-part of U.S. patent application Ser. No. 13/770,955, filed on Feb. 19, 2013 and entitled "Identifying Relevant Messages in a Conversation Graph." U.S. patent application Ser. No. 13/770,955 is a continuation-in-part of U.S. patent application Ser. No. 13/736,634, filed on Jan. 8, 2013 and entitled "Identifying Relevant Messages in a Conversation Graph." Accordingly, this application claims benefit from U.S. patent application Ser. No. 13/770,955 and U.S. patent application Ser. No. 13/736,634 under 35 U.S.C. §120. U.S. patent application Ser. No. 13/770,955 is incorporated by reference herein, in its entirety, for all purposes.

Where a definition or use of a term in a reference which is incorporated by reference herein is inconsistent or contrary to the definition of that term provided herein, the definition of that term provided herein applies and the definition of that term in the incorporated reference does not apply.

COPYRIGHT NOTICE

A portion of the disclosure of this patent document may contain material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND

Social networking services allow users to author and share messages with multiple users. For example, a first user can author and publish a message for other users to read. The messages can be any of a variety of lengths which may be limited by a specific messaging system or protocol. For example, a short messaging service protocol typically limits messages to 140 characters in length.

Users interested in viewing messages authored by a particular user can choose to follow the particular user. A first user can follow a second user by identifying the second user as a user the first user would like to follow. After the first user has indicated that they would like to follow the second user, the first user will be provided with messages authored by the second user. Users can choose to follow multiple users. Users can also respond to messages and thereby have conversations with one another. Both unidirectional (e.g., follower/followee) and bidirectional (e.g., friendship) relationships may exist, depending on the type of network.

A conversation can include a root message and any number of messages directly or indirectly in reply to the root message. A conversation graph is a data structure which represents two or more messages in a conversation as nodes, with edges connecting the nodes based on a reply structure of the conversation. Users can view a conversation based on messages included in the conversation graph. However, when a conversation includes a large number of messages, the number of messages displayed can be very large and may overwhelm the user.

SUMMARY

In general, in one aspect, the invention relates to a method for displaying a relevant conversation. The method includes: identifying a conversation graph identifying messages broadcasted by a set of authoring accounts; selecting a subset of messages of the conversation graph for inclusion in a relevant conversation; adding, by a computer processor, a first message of the relevant conversation to a reverse chronological stream of messages associated with a recipient account; identifying, by the computer processor, a previously broadcasted second message of the relevant conversation, where the second message is an ancestor of the first message in a branch of the conversation graph; and providing at least a portion of the stream of messages for display on a client device, where the client device displays, concurrently with the first message in the stream of messages, an indication of the second message and a display element indicating that the second message is the ancestor of the first message.

In general, in one aspect, the invention relates to a method for displaying a relevant conversation. The method includes: receiving, by a client device, a reverse chronological stream of messages broadcasted to a recipient account of a messaging platform from a set of authoring accounts, the set of authoring accounts having a predefined graph relationship with the recipient account; identifying, among the stream of messages, a first message selected for inclusion in a relevant conversation among messages of a conversation graph; identifying a previously broadcasted second message selected for inclusion in the relevant conversation from among messages of the conversation graph, where the second message is an ancestor of the first message in a branch of the conversation graph; and displaying, by the client device and concurrently with the first message in the stream of messages, an indication of the second message and a display element indicating that the second message is the ancestor of the first message.

In general, in one aspect, the invention relates to a client computing device. The client computing device includes: a computer processor; and a memory including a client application configured to execute on the computer processor to enable the computer processor to: receive a reverse chronological stream of messages broadcasted to an account of a messaging platform from a set of authoring accounts, the set of authoring accounts having a predefined graph relationship with the account; identify, among the stream of messages, a first message selected for inclusion in a relevant conversation among messages of a conversation graph; identify a previously broadcasted second message selected for inclusion in the relevant conversation from among messages of the conversation graph, where the second message is an ancestor of the first message in a branch of the conversation graph; and display, concurrently with the first message in the stream of messages, an indication of the second message and a display element indicating that the second message is the ancestor of the first message.

In general, in one aspect, the invention relates to a non-transitory computer readable medium comprising computer readable program code for: receiving, by a client device, a reverse chronological stream of messages broadcasted to a recipient account of a messaging platform from a set of authoring accounts, the set of authoring accounts having a predefined graph relationship with the recipient account; identifying, among the stream of messages, a first message selected for inclusion in a relevant conversation among messages of a conversation graph; identifying a previously broadcasted second message selected for inclusion in the relevant conversation from among messages of the conversation graph, where the second message is an ancestor of the first message in a branch of the conversation graph; and displaying, by the client device and concurrently with the first message in the stream of messages, an indication of the second message and a display element indicating that the second message is the ancestor of the first message.

Other aspects of the invention will be apparent from the following description and the appended claims.

BRIEF DESCRIPTION OF DRAWINGS

FIG. 4 depicts an account data table, in accordance with one or more embodiments of the invention.

FIGS. 7A, 7B, and 8-18 depict example user interfaces displayed by a mobile device, in accordance with one or more embodiments of the invention.

DETAILED DESCRIPTION

Figure 1:
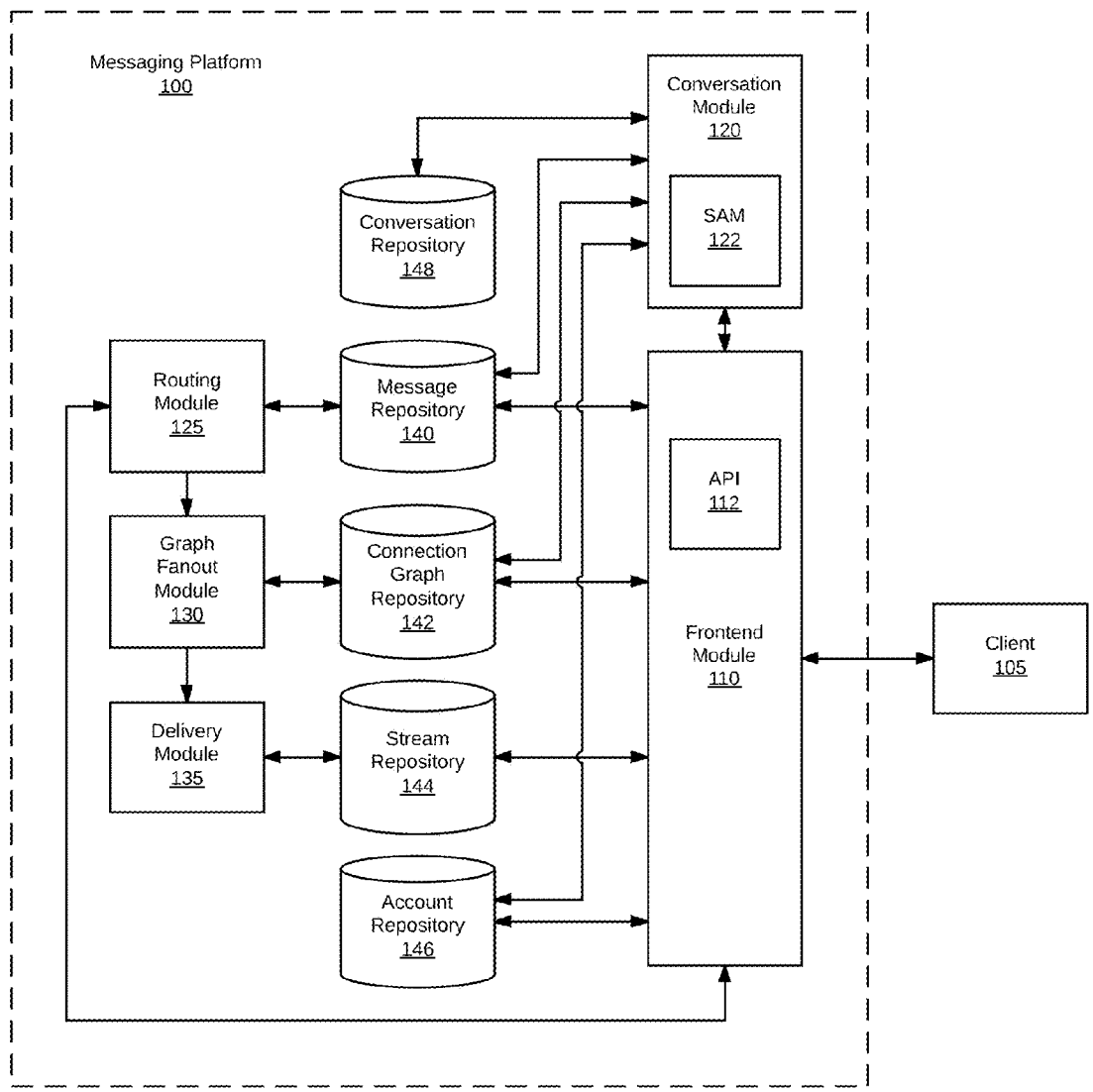
FIG. 1 depicts a diagram of a messaging platform in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for displaying relevant messages of a conversation graph. A stream of messages broadcasted to a recipient account of a messaging platform is received. The set of authoring accounts having a predefined graph relationship with the recipient account. Among the stream of messages, a message determined to be a part of a relevant conversation is identified. Additional content associated with the conversation is then inserted into the stream. A client displaying the stream displays the conversation related content with one or more display elements depicting relationships among messages of the conversation.

FIG. 1 shows a messaging platform (100) and a client (105), in accordance with one or more embodiments of the invention. As shown in FIG. 1, the messaging platform (100) can have multiple components including a frontend module (110), an application programming interface (API 112), a conversation module (120), a semantic analysis module (SAM 122), a conversation repository (148), a routing module (125), a graph fanout module (130), a delivery module (135), a message repository (140), a connection graph repository (142), a stream repository (144), and an account repository (146). Various components of the messaging platform (100) of FIG. 1 may be located on the same device (e.g., a server, mainframe, desktop Personal Computer (PC), laptop, mobile phone, kiosk, cable box, and any other device) or may be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform (100) by associating the user with a temporary account or identifier.

For purposes of this disclosure, a conversation graph is a data structure or a collection of data structures representing a reply structure of messages posted to the messaging platform (100). In one or more embodiments of the invention, a conversation graph can represent any subset of messages of a given conversation. In one or more embodiments of the invention, a master conversation graph can refer to a type of conversation graph which represents all messages in a given conversation (i.e., all messages within the same reply structure).

Figure 2:
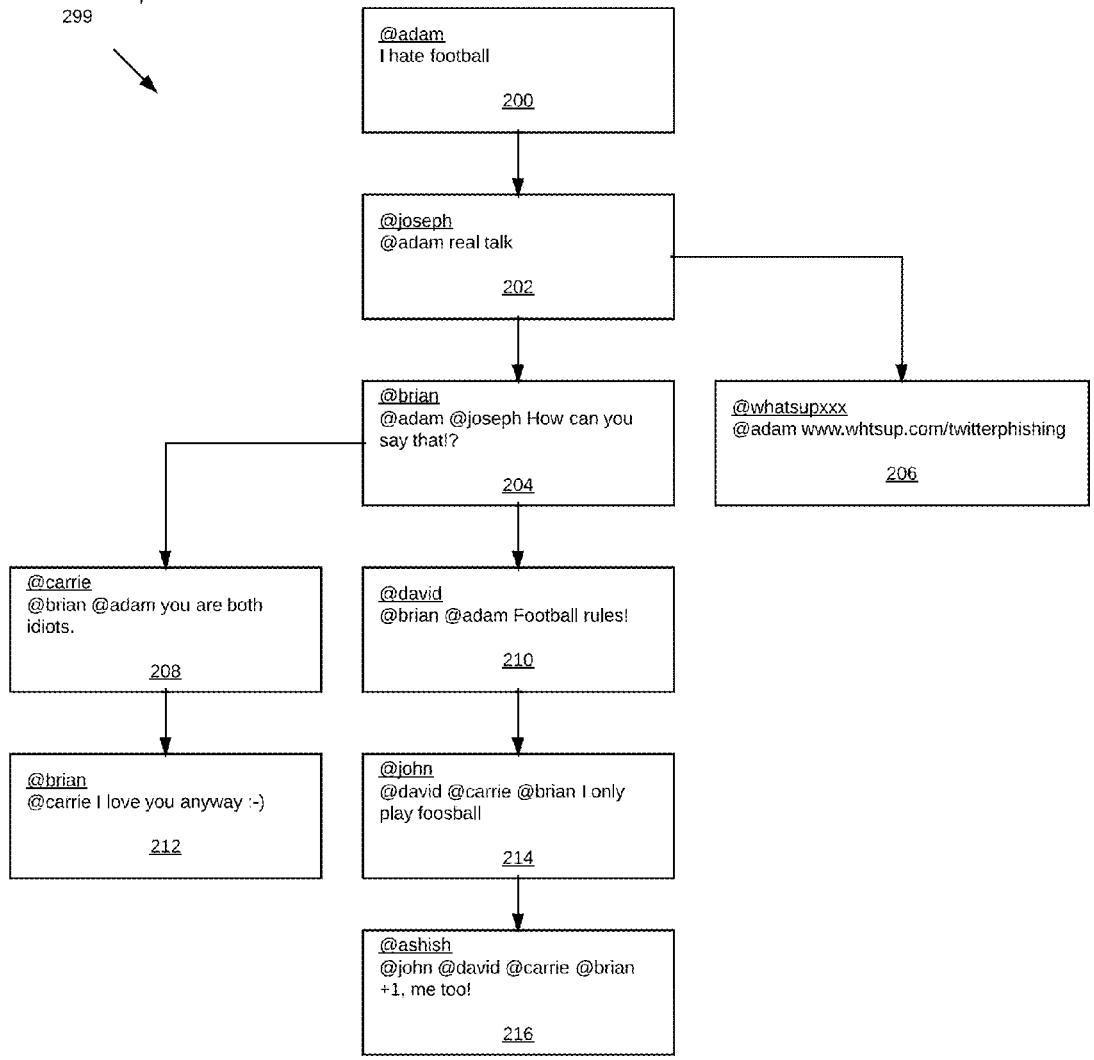
FIG. 2 depicts a graphical representation of a conversation graph, in accordance with one or more embodiments of the invention.

FIG. 2 is an example depiction of a conversation graph (299) comprising messages 200 through 216. A conversation graph is a data structure including messages of a conversation. In one or more embodiments, the conversation graph includes a root message (e.g., message 200 of FIG. 2) and one or more messages connected, either directly or indirectly, to the root message (e.g., messages 204-216 of FIG. 2). The relationships between the nodes of the conversation graph represent a reply structure of the conversation, wherein each child node is a reply message to at least one corresponding parent node, in accordance with various embodiments of the invention. The author of a message is shown underlined in FIG. 2. For example, the author of message 200 is associated with the account "@adam" as identified by the underlining. Messages 200-216 correspond to message data stored in table 300 of FIG. 3. For example, record 312 of table 300 is identified in message ID field 302 as message "1" which corresponds to message 200 depicted in FIG. 2. Record 314 of table 300 is identified in message ID field 302 as message "2" which corresponds to message 202 in FIG. 2. Record 316 of table 300 is identified in message ID field 320 as message "3" which corresponds to message 204 in FIG. 2.

Although conversation graph 299 is depicted in FIG. 2 using a graphical format, the messages depicted in FIG. 2, in one or more embodiments, can be stored in a message repository (e.g., message repository 140 of FIG. 1) in any appropriate data structure. In this example, message 200 is a root message (i.e., the parent of all messages shown in FIG. 2). Child message 202 is a reply message that is in reply to message 200 as identified by the line connecting message 202 to message 200. Child messages 204 and 206 are reply messages that are in reply to message 202, the relationships of which are shown by the lines connecting the messages. In this example, messages 202-216 are reply messages under root message 200.

Conversation graph 299, in one or more embodiments, is constructed based on the reply structure of messages 200-216. The reply structure may be identified based on metadata associated with each message and/or reply information identified from within the message content, in accordance with various embodiments. For example, in one embodiment, metadata stored in the In Reply to field 210 of table 200 is used to generate a conversation graph. More specifically, the metadata maintains the reply relationships between multiple messages of a conversation. Thus, in this example, each message can be in reply to only one parent message, and only messages which are in the reply structure of the root message are included in the conversation graph. It should be noted that displaying messages solely from accounts having a pre-defined graph relationship with a user's account may render the conversation incomprehensible to the user.

It should be noted that messages can be categorized into various types. For example, a message posted by a particular author without an indication that the message is directed to a particular account may be referred to, in one embodiment, as a broadcast message or simply a message. Broadcast messages are displayed to users with accounts associated with (e.g., following, friends with, etc.) the account of the broadcast message. A message in reply to another message is considered a reply message or, more simply, a reply. In one embodiment, the category of a message determines whether the message will be designated to be displayed to another account or included in other account's message streams. A direct message (also referred to as a private message) is a message that explicitly identifies one or more accounts as recipients. For example, a message from a user associated with the account @keith that is explicitly directed (by the user authoring the message) to the account @carrie is considered a direct message from @keith to @carrie.

Figure 3:
FIG. 3 depicts a message table, in accordance with one or more embodiments of the invention.

FIG. 3 depicts an example of a message table 300 which includes multiple records (e.g., 312, 314, 316) containing message data fields 302-310 associated with a message identified by message ID 302. Author Account ID field 304 contains an identifier indicating an account associated with an author of the message identified by message ID 302. In one or more embodiments, each account is associated with a unique account ID. For example, a user named Adam Smith may select the identifier "adam", which is represented as "@adam". Other identifiers, such as alpha-numeric identifiers, can be selected as well. Message content 306 contains the content of a message identified by message ID 302 field. Typically, the content of a message consists of text. However, in one or more embodiments of the invention, message content can contain various media and/or may include one or more references to various media (e.g., a uniform resource locator (URL) of a video).

In one or more embodiments, relevant participant(s) account ID 308 field contains identifiers of one or more relevant accounts. In one embodiment, the relevant participant(s) account ID 308 excludes the authoring account and/or the parent account (i.e., the author of a message which the message is in reply to) if the message is a reply message. For example, message content 306 can contain text such as "@johnqpublic is correct!". The character string "@johnqpublic" indicates that an account associated with the "@johnqpublic" identifier is mentioned in the content of the message. The mentioned account identifier ("@johnqpublic") is inserted into relevant participant(s) 308 field. Identified relevant participants can then be used as a factor in determining which messages in a conversation graph to surface to one or more users (e.g., which messages to include in a relevant conversation).

In one or more embodiments of the invention, in reply to field 310 identifies a parent message that a particular message is in reply to. For example, record 314 identifies message ID number 2 which is identified as being in reply to message ID number 1. The relationships among messages may be used to identify various messages for inclusion in a conversation graph. The reply relationships between two or more messages may be identified based on a variety of different data, in accordance with various embodiments. In one or more embodiments, the reply structure is identified based on metadata associated with each message which is received from a client used to compose the message. For example, a user may click on a "Reply" link displayed below a message displayed in the user's home stream. The client may then display a message composition box for drafting a reply message. The client may submit metadata including the reply relationship (i.e., a message ID of the parent message) with the reply message. Conversely, in another example, the reply relationship may be explicitly defined by the user within the message content. In this example, the reply structure may be identified by identifying one or more account IDs and/or message IDs mentioned within the message content. The designation between authors of parent messages and relevant participants, if any, may be made based on any number of syntactical rules. Thus, the message platform 100 may require that if a message begins with an account ID (e.g., "@john"), the message will be marked as being in reply to a latest message from the mentioned account ID. Thus, the reply to field 310 may be populated based on any means of identifying a reply structure of two or more messages. Lastly, it should be noted that while many of the examples depicted herein include a requirement that each message can only have one parent message, embodiments of the invention may be implemented in a system allowing multi-parent reply structures (i.e., a single message being in reply to two or more parent messages).

FIG. 4 depicts account data table 400 which includes multiple records 410-424 containing user data 404-406 associated with an account identified by account ID 402. Account ID field 402 contains an identifier which uniquely identifies each account of the messaging platform (100). In one embodiment, the account ID is selected by a user. Although many users may choose to select an account ID that is a concatenation of the user's first and last name, or the name of a business or service, the account ID can be any character string (e.g., an alpha-numeric string). Display name 404 contains an identifier indicating a user's selected display name. In one or more embodiments, display name 404 is a character string, typically chosen by a user as a name used by the messaging platform (100) for purposes of display. For example, display name 404 may be a business name, a pseudonym, and/or any other display name selected by a user of the account. Each account ID 402 can be associated with a display name 404, although display names are not required to be unique. In one or more embodiments, user names and account IDs are used to facilitate recognition of authors by readers and are used by messaging platform 100 to perform various functions.

In one or more embodiments, followed by field 406 contains identifiers indicating accounts following an account identified by account ID 402. In one or more embodiments, a user can choose to follow another account. A user following a particular account receives messages authored by a user associated with the particular account intended for public viewing. For example, if the user associated with the particular account enters a message for public viewing, all users following the particular account can view the message. In one or more embodiments, users following the particular account will receive a push notification (on their computing device) indicating that a user associated with the particular account has posted a message. In one or more embodiments, users following the particular account will receive a copy of the message the user of the particular account authored for public viewing. For example, FIG. 4 shows that account "@adam" is followed by "@brian", "@carrie", "@david", and "@joseph". As such, "@brian", "@carrie", "@david", and "@joseph" are subscribed to receive messages authored by a user associated with the account "@adam". In one or more embodiments, followed by field 406 is implemented as a bidirectional relationship field (e.g., friendship) and represents a mutual connection between accounts of the messaging platform.

Returning to FIG. 1, in one or more embodiments of the invention, the conversation module (120) includes functionality to identify one or more relevant conversations based on a conversation graph. For example, the conversation module (120) may be configured to perform the functions described herein in connection with FIGS. 5-7 and/or to receive requests from a user via the front end module (110). In one or more embodiments of the invention, relevant conversations determined by the conversation module (120) are stored in the conversation repository (148). The conversation repository (148) includes, in one or more embodiments, functionality to transmit one or more relevant conversations, and/or messages from a relevant conversation, in response to requests from, for example, the conversation module (120) or the front end module (110) via the conversation module (120).

In one or more embodiments of the invention, the conversation module (120) includes functionality to identify a conversation graph. The conversation graph can be retrieved, for example, from the conversation repository (148). Conversation graphs can be constructed based on messages in the message repository (140) and stored in the conversation repository (148) by the conversation module (120) or one or more related components of the messaging platform (100), in accordance with various embodiments.

In one or more embodiments of the invention, the conversation module (120) includes functionality to receive a request for a relevant conversation. The request can be for a portion of the relevant conversation, such as, for example, the 10 nearest relevant messages to a context message. Any other criteria or data can be provided, in conjunction with the request, to identify at least a segment of the relevant conversation. For example, the request can include a parameter value defining a number of requested messages. The conversation module (120) can be configured to return the number of requested messages from a relevant conversation based on the parameter value.

In one or more embodiments of the invention, the request for a relevant conversation includes context data. One example of context data is a context message. A context message can be any message of the conversation which is identified by the request. The context message can be used to identify a context of a request for a relevant messages. Any one of the messages in a conversation graph can be identified as a context message. Examples of a context message can include, but are not limited to, a message selected by a user, a message including a specified keyword or topic, a message returned in response to a search request, a message associated with an advertisement, and/or any other message included in at least one conversation graph. In one or more embodiments, the context message is identified based on a user selecting a message from a message stream presented via front end module 110. In other embodiments, the context message may be identified as a message including a specified keyword or topic, a message returned in response to a search request, and/or a message associated with an advertisement. Other examples of context data can include, but are not limited to, a number of requested messages, a pagination offset indicating a window of messages (e.g., a position below a context message), a requesting account (i.e., a requester of the relevant conversation), one or more relevant topics (i.e., predefined categories used to adjust message/account relevance scores, discussed below), and any other information relevant to identifying messages within the conversation graph.

In one or more embodiments of the invention, the conversation module (120) includes functionality to prune a conversation graph based on context data. In one or more embodiments, the conversation graph can be pruned prior to applying any relevance filters, to include only (1) the root message, (2) the context message, (3) all messages connecting the root message to the context message, and/or (4) all direct or indirect children of the context message. In this way, for example, the conversation graph can be modified to include only a single branch of messages connecting the root message to the context message, as well as any number of branches below the context message.

In one or more embodiments of the invention, the conversation module (120) includes functionality to assign relevance scores to authoring accounts of messages of a conversation graph. Thus, each authoring account of a message of the conversation graph is assigned a relevance score (i.e., an account relevance score). The relevance score can be an arbitrary initial score or any other baseline score assigned prior to applying one or more relevance filters. For example, all account relevance scores can be initialized to a value of zero.

In one or more embodiments of the invention, the conversation module (120) includes functionality to apply relevance filters to the conversation graph in order to modify one or more the relevance scores of the authoring accounts. Relevance filters which are used to modify relevance scores of authoring accounts can be referred to as account relevance filters.

In the following description of relevance filters, an increase in a relevance score can be implemented as a relative increase or a fixed amount increase. For example, if a relevance filter is said to increase the relevance score of an authoring account, the account relevance score can be incremented by 2, or all other relevance scores can be decremented by 2 resulting in a relative increase for the authoring account. In another example, the relevance score of a message can be increased by 20%, or based on a factor of the standard deviation of all the relevance scores. Likewise, in one or more embodiments of the invention, a decrease in a relevance score can be implemented as a relative decrease or a fixed amount decrease.

In one or more embodiments of the invention, the conversation module (120) includes functionality to apply a relevance filter to increase the relevance score(s) of an authoring account of a context message and/or an authoring account of a root message of the conversation graph. In one or more embodiments, even if the authoring account(s) of the root and/or context message are not selected for inclusion in the relevant conversation, the root message and/or the context message are always included in the relevant conversation.

In one or more embodiments of the invention, applying the relevance filter includes designating one or more authoring accounts as blessed. For example, an authoring account of the context message and/or root message can be designated as blessed. The conversation module (120) can be configured to increase the relevance scores of the blessed accounts and/or to identify one or more messages of the conversation graph which are replied to by a blessed account. As part of applying the relevance filter, the conversation module (120) can then increase the relevance scores of the authoring accounts of the replied-to messages. In one or more embodiments of the invention, the relevance scores of the authoring accounts of the replied-to messages can be increased by a lower amount relative to the relevance scores of the blessed accounts. In one or more embodiments of the invention, the conversation module (120) is configured to designate authoring accounts having a relevance score exceeding a predefined threshold as blessed. By identifying blessed accounts, and then increasing the relevance scores of one or more accounts associated with the blessed accounts (e.g., based on their reply relationship in the conversation graph), the conversation module (120) can be configured to repeat the process by checking to see if any of the modified relevance scores now exceed the predefined threshold. If so, the conversation module (120) can designate the authoring accounts with the exceeding relevance scores as blessed. The conversation module (120) can be configured to repeat this process until convergence (i.e., until no additional authoring accounts are designated as blessed). In one or more embodiments of the invention, the authoring account(s) of the context message and/or root message are not assigned relevance scores, but are always included in the relevant conversation. Whether or not the authoring account(s) of the context message and/or root message are assigned relevance scores, in one or more embodiments, the authoring account(s) of the context message and/or root message can be designated as blessed and used by the conversation module (120) for the purpose of identifying additional blessed accounts (as described).

In one or more embodiments of the invention, the conversation module (120) includes functionality to apply a relevance filter to modify the relevance scores of one or more authoring accounts based on a credibility rating of each account. As part of applying the relevance filter, the conversation module (120) can be configured to identify a credibility rating of each authoring account of the conversation graph. The conversation module (120) can then be configured to modify the relevance scores of the accounts based on their corresponding credibility rating. For example, the conversation module (120) can be configured to apply a proportional increase/decrease to the relevance score based on a standard deviation of the accounts credibility score. In another example, the conversation graph (120) can be configured to increase the relevance scores of authoring accounts having a credibility rating exceeding a predefined threshold.

In one or more embodiments of the invention, the conversation module (120) includes functionality to apply a relevance filter to increase the relevance scores of one or more authoring accounts of the conversation graph which are identified in a whitelist of verified accounts. For example, the whitelist of verified accounts can be a list of accounts which are high-profile accounts which are susceptible to impersonation. In this example, celebrity and business accounts would be verified by the messaging platform (100) in order to notify users of the messaging platform (100) that the accounts are authentic. In one or more embodiments of the invention, the conversation module (120) is configured to increase the relevance scores of verified authoring accounts by a predefine amount/percentage.

In one or more embodiments of the invention, the conversation module (120) includes functionality to apply a relevance filter to decrease the relevance scores of one or more authoring accounts of the conversation graph which are identified in a blacklist. Examples of blacklisted accounts can include, but are not limited to, potential spammers, potentially fake accounts, accounts with a potential or history of posting adult content, accounts with a potential or history of posting illegal content, accounts flagged by other users, and/or meeting any other criteria for flagging accounts. For example, accounts with suspicious activity or accounts with a history of violating guidelines of the messaging platform (100), though not currently banned, can be included in the blacklist of accounts. In one or more embodiments of the invention, the conversation module (120) is configured to decrease the relevance scores of blacklisted accounts by a predefine amount/percentage.

In one or more embodiments of the invention, the conversation module (120) includes functionality to apply a relevance filter to entirely exclude messages authored from blacklisted accounts from a conversation graph. Thus, the conversation graph can be configured to designate the messages as non-relevant, irrespective of relevance scoring.

In one or more embodiments of the invention, the conversation module (120) includes functionality to apply a relevance filter to modify the relevance scores of one or more authoring accounts based on context data. For example, the conversation module (120) can be configured to identify a requesting account associated with the request for the relevant conversation. In this example, the requesting account is an account of a user requesting to view the relevant conversation. The user has logged into their account using a web browser of a laptop computer. The user then selected a "view conversation" link within a representation of a single message of a stream of messages displayed in the web browser. Continuing the example, the browser requests the relevant conversation and provides an identifier of the user's account as context data. In one or more embodiments, the conversation module (120) is configured to identify one or more authoring accounts of the conversation graph having a predefined graph relationship with the requesting account. Examples of the predefined graph relationship can include, but are not limited to, friendship, subscription, follower/followee (i.e., accounts followed by requesting account), accounts "favorited" by the requesting account, and/or any other unidirectional or bidirectional relationship between the requesting account and at least one other authoring account of the conversation graph. The conversation module (120) can then, for example, be configured to increase the relevance scores of the accounts having the predefined graph relationship with the requesting account.

In one or more embodiments of the invention, the conversation module (120) includes functionality to apply a relevance filter to modify the relevance scores of one or more authoring accounts based on engagement data. For example, the conversation module (120) can be configured to identify messages having a higher than expected amount of one or more types of engagement. Examples of a type of engagement can include, but are not limited to, replies, favorites, rebroadcasts, shares, views, and/or any other type of measurable interaction with one or more messages. The conversation module (120) can be configured to identify a threshold engagement amount for a given type of engagement, and to compare a measured engagement value with the threshold amount. The measured engagement value can be for one or more messages of the conversation graph. In response to detecting that the measured engagement value of a message exceeds the threshold engagement amount, the conversation module (120) can be configured to increase a relevance score of an authoring account of the message. In this way, the conversation module (120) can be configured to modify the relevance scores of one or more authoring accounts of the conversation graph based on engagement data of one or more messages represented by the conversation graph.

In one or more embodiments of the invention, the conversation module (120) includes functionality to identify relevant participants. Relevant participants may be identified based on a variety of different data. For example, relevant participants may be tagged by the user during composition of the message and may be stored as metadata associated with the message (i.e., not within the message content). In another example, relevant participants may be explicitly tagged within the content of the message, as in the example discussed above with regard to FIG. 3 (e.g., "@johnqpublic is correct!"). Lastly, in yet another example, relevant participants are inferred based on text or data within the content of the message (e.g., facial recognition, display name matching, etc.). Thus, in one or more embodiments of the invention, the conversation module (120) can be configured to identify a relevant participant based on a character string of text which is not explicitly tagged as an account identifier (e.g., not preceded by the "@" symbol). For example, a user may be identified by the user's real name. If the user's real name can be found in display name column 404 of FIG. 4 (described in further detail above), then that user's account ID can be inserted into relevant participant(s) Account ID 208 field of an appropriate record. The conversation module (120) can be configured to store the relevant participants in a field of a message table (e.g., column 308 of message table 300, discussed above).

In one or more embodiments of the invention, the conversation module (120) includes functionality to apply a relevance filter to modify the relevance scores of one or more authoring accounts based on relevant participants. For example, the conversation module (120) can be configured to increase the relevance scores of authoring accounts which are identified as relevant participants of in a message of a blessed, highly credible, and/or high relevance account.

In one or more embodiments of the invention, the conversation module (120) includes functionality to assign a relevance score to one or more messages of a conversation graph. Thus, each message of the conversation graph is assigned a relevance score (i.e., a message relevance score). The relevance score can be an arbitrary initial score or any other baseline score assigned prior to applying one or more relevance filters. For example, all message relevance scores can be initialized to a value of zero.

In one or more embodiments of the invention, the conversation module (120) includes functionality to apply relevance filters to the conversation graph in order to modify one or more message relevance scores. Relevance filters which are used to modify relevance scores of messages can be referred to as message relevance filters.

In one or more embodiments of the invention, the conversation module (120) includes functionality to apply a relevance filter to increase the message relevance score of a context message and/or a root message of the conversation graph. Similar to the account relevance filters (discussed above), message relevance scores can be modified based on engagement data of the corresponding message, a blessed authoring account, credibility rating of the authoring account, whitelisted authoring accounts, blacklisted authoring accounts, context data, and/or any other criteria for determining relevance and/or importance of a message in the conversation graph.

In one or more embodiments of the invention, the conversation module (120) includes functionality to apply the relevance filters according to a predefined sequence. The sequence of applying relevance filters can be significant in the case of dependency between one or more relevance filters and/or if data required to modify one or more relevance scores otherwise changes over time. For example, if the conversation module (120) is configured to identify blessed accounts based on their relevance scores exceeding a predefined threshold, it may be advantageous to execute one or more other relevance filters (which may modify those relevance scores) prior to designating the blessed accounts. Thus, in one or more embodiments, a credibility relevance filter (i.e., a relevance filter which can modify relevance scores based on a credibility rating), a verified relevance filter (i.e., a relevance filter which can modify relevance scores based on a whitelist of verified accounts), a relationship graph relevance filter (i.e., a relevance filter which can modify relevance scores based on accounts having a predefined graph relationship with a requesting account), and/or any number of other relevance filters can be executed by the conversation module (120) prior to executing a blessing relevance filter (i.e., a relevance filter which can modify relevance scores based on designating blessed accounts, discussed above). More generally, in one or more embodiments, the conversation module (120) can be configured to identify a volatility ranking of each relevance filter, which indicates a degree of dependency upon the execution of other filters and/or a preferred order of execution. The conversation module (120) can then execute the relevance filters in order of their corresponding volatility ranking.

In another example, engagement data which may be required to apply a relevance filter (as discussed above) accumulates over time. Thus, a relevance filter requiring engagement data can be applied periodically, on-demand, and/or after a fixed time period after the root message is posted. Other data required by one or more relevance filters, such as credibility of an authoring account and verified status of an authoring account, are less likely to change over time. As a result, relevance filters requiring this data can be applied earlier in the sequence and/or aperiodically.

In one or more embodiments of the invention, the conversation module (120) includes functionality to apply the relevance scores by recursively and/or iteratively traversing the conversation graph until convergence. Thus, for example, the conversation module (120) can designate accounts as blessed by traversing the conversation graph and identifying messages which are replied to by blessed accounts. The replied to accounts can then be designated as being blessed, and the process can be repeated until no new replied-to accounts are identified (i.e., convergence).

In one or more embodiments of the invention, the conversation module (120) includes functionality to modify one or more message relevance scores based on one or more account relevance scores. Furthermore, in one or more embodiments of the invention, any one of the account relevance filters can be used by the conversation module (120) to modify one or more message relevance scores by modifying the message relevance scores of all messages posted by an authoring account rather than an account relevance score of the authoring account. In one or more embodiments of the invention, the conversation module (120) is configured to assign a weight to the message relevance score and account relevance score of each message in the conversation graph. For example, the account score can be weighted at 60% while the message relevance score is weighted at 40%. In this way, the conversation module (120) can calculate an aggregate relevance score for each message of the conversation graph.

In one or more embodiments of the invention, the conversation module (120) includes functionality to select a subset of messages of the conversation graph for inclusion in a relevant conversation. The conversation graph (120) can select the messages based on relevance scores of the authoring accounts and/or based on message relevance scores. In one or more embodiments of the invention, the conversation module (120) includes functionality to use a threshold for selecting relevant messages for inclusion in the relevant conversation. The threshold can be a fixed minimum relevance score, a minimum distance from the standard deviation of the relevance scores, a fixed number of the highest relevance scores, and/or any other criteria for modifying the number of messages selected for inclusion in the conversation graph.

In one or more embodiments of the invention, each relevance filter can be either query-dependent or query-independent. Query-independent relevance filters do not require context data. Thus, for example, a query-independent relevance filter can be applied to a conversation graph even prior to receiving a client request for a relevant conversation. In this example, the query-independent filter can be used to prune one or more messages from the conversation graph or to pre-calculate/modify one or more relevance scores. In this way, a pruned conversation graph and/or a pre-calculated relevant conversation can be stored in the conversation repository (148). Similarly, the conversation module (120) can store one or more pre-calculated relevance scores in the conversation repository (148). Subsequently, after receiving context data associated with a request, the conversation module (120) can apply one or more query-dependent relevance scores to the conversation graph in order to identify a relevant conversation on-demand.

In one or more embodiments of the invention, the conversation module (120) is configured to provide the relevant conversation as a list of relevant messages selected from the conversation graph and ordered vertical-chronologically by posting time. Alternatively, in one or more embodiments, a reply structure of the messages is maintained and provided to the client (105) (e.g., so the client can display a multi-threaded representation of the relevant conversation).

In one or more embodiments of the invention, the conversation module (120) includes functionality to provide at least a portion of the relevant conversation to a client (e.g., client 105). The portion of the relevant conversation can be selected based on context data, a default requirement, identification of one or more of the message by the client (105), a pagination parameter provided by the client (105), and/or any other criteria for selecting messages of the relevant conversation. Thus, for example, a client may request 10 messages of a relevant conversation, and the conversation module (120) may provide a first 10 messages of the relevant conversation in the absence of any context data. In another example, the client (105) provides a context message in conjunction with the request, and the conversation module (120) provides a window of messages surrounding the context message from the relevant conversation. The window of messages can be a vertical/horizontal list of messages in chronological order of their posting time to the messaging platform (100) or can include one or more elements of their placement within the reply structure of the conversation graph. Thus, the client (105) can be configured to display a threaded view of the window of messages (e.g., to delineate the separate threads of messages within the window of messages) or to display a non-threaded new (e.g., a list), in accordance with various embodiments of the invention. An example of a threaded view can be some variation of the conversation graph (299) of FIG. 2 displayed in a user interface (UI) of the client (105), with only the messages provided in the window of messages shown. In this example, other messages of the relevant conversation (i.e., those not included in the window of messages), can be represented by a selectable UI element such as an ellipsis. Upon receiving a selection of the selectable UI element, the client (105) can be configured to expand the relevant portion of the relevant conversation by sending a request for a modified window of the relevant conversation (e.g., including a pagination parameter) to the frontend module (110).

In one or more embodiments of the invention, the conversation module (120) is configured to receive a pagination parameter and to provide adjacent sections of N (i.e., a predefined number of) messages from the relevant conversation in response to requests including a pagination parameter.

The semantic analysis module (128), in one or more embodiments, is included in the conversation module (120). In other embodiments, the semantic analysis module (128) is a module separate from the conversation module (120). The semantic analysis module (128) includes functionality to identify one or more topics associated with messages, accounts, and/or conversations as described in further detail below.

In one or more embodiments of the invention, the semantic analysis module (128) includes functionality to identify one or more topics associated with messages, accounts, and/or conversations. For example, the semantic analysis module (128) can analyze a message based on frequency of a word, density of a word, connotations of a word, semantic equivalents of a word, sentiments associated with a word, and/or any other criteria for categorizing an account, message, or conversation. In one or more embodiments of the invention, the semantic analysis module (128) includes functionality to modify a relevance score based on a relevance of a message, account, or conversation to a topic. The semantic analysis module (128) can then provide one or more modified relevance scores to the conversation module (120) in response to a request. In one or more embodiments of the invention, the semantic analysis module (128) is configured to identify one or more authors of messages in the conversation with high relevance scores to a topic. In other words, if a conversation has a high relevance score to the topic "basketball" the semantic analysis module (128) may identify one or more professional basketball players with messages in the conversation graph (by virtue of the fact that a basketball player's account may have a high relevance score to the topic "basketball"). In this example, the semantic analysis module (128) then increases the relevance scores of the authoring accounts in proportion with their relevance to the topic.

In one or more embodiments of the invention, as part of applying a relevance filter, the conversation module (120) includes functionality to provide one or more selected topics to the semantic analysis module (128). The semantic analysis module (128) can then modify one or more relevance scores of a conversation graph based on relevance of the messages/accounts/conversation graph to the provided topics. In one or more embodiments, the topics are context data associated with a request for a relevant conversation. The topics can be received from the client (105) in conjunction with a request for a relevant conversation, or can be inferred/selected by the conversation module (120), in accordance with various embodiments of the invention.

In one or more embodiments of the invention, the conversation module (120) includes functionality to add one or more messages of the relevant conversation to a reverse chronological stream of messages associated with a recipient account. The conversation module (120) can add a message according to a predefined relationship between an authoring account of the message and the recipient account. As an example of a predefined graph relationship, the recipient account may be a follower of the authoring account, in which case messages broadcasted by the authoring account can be inserted into one or more streams of the recipient account.

In one or more embodiments of the invention, the conversation module (120) includes functionality to identify a previously broadcasted message of the relevant conversation that is an ancestor of a message inserted into the stream of the recipient account. The previously broadcasted message can be an immediately prior message of the relevant conversation or can be selected based on its associated relevance score. Thus, in one or more embodiments, the conversation module (120) selects a predefined number of previously broadcasted messages that are (i) within a common branch of the relevant conversation and/or (ii) have a highest relevance score among previous messages of the branch.

The previously broadcasted message need not be authored by an account having any predefined graph relationships with the recipient account. In other words, if the stream is configured to display messages of followed accounts, the previously broadcasted message may be authored by an account which is not followed by the recipient account. The conversation module (120) may insert the previously broadcasted message into the stream based on the message being an ancestor of another message in the stream which is part of the same relevant conversation. For purposes of this disclosure, an ancestor of a first message can be any message of a conversation which precedes the first message in a branch of the conversation. In other words, the first message can be referred to as a direct or indirect reply to the ancestor. An indirect reply to a first message can be any message that is within a common branch of the conversation which is at least 2 levels below the first message. In the preceding examples, the first message can be any message of the conversation graph, including but not limited to the root message.

In one or more embodiments of the invention, the conversation module (120) includes functionality to link one or more previously broadcasted messages with a newly broadcasted message of a conversation within a stream of a recipient account. Linking the messages can refer to storing an association between the previously broadcasted message(s) and the newly broadcasted message in a storage repository or memory (e.g., the conversation repository (148)). In one or more embodiments, the association is stored as part of the stream and is sent to one or more client devices with the associated stream data. The client devices can then display an indication of the previously broadcasted message(s) based on the association.

In one or more embodiments of the invention, the conversation module (120) includes functionality to remove a previously broadcasted message from an original location in the stream of the recipient account upon determining that an indication of the previously broadcasted message is to be displayed with a newly broadcasted message in the same stream. The original location can correspond to an original broadcast time of the second message. In this way, in one or more embodiments, the conversation module (120) can be configured to "deduplicate" messages from the stream by removing duplicate references to the same message within a common stream.

In one or more embodiments of the invention, the client (105) includes functionality to receive a stream of messages from the conversation module (120) and to display the messages in reverse chronological order of their respective broadcast times. The client (105) (e.g., a mobile application executing on the client (105)) can identify messages (and/or content) of the stream that are associated with a relevant conversation and display those messages with previously broadcasted messages from within the same stream and/or from outside of the stream (e.g., relevant messages from accounts not directly connected to the recipient account). The relevant messages can be displayed vertically/horizontally in chronological order as part of a content grouping associated with the conversation. In one or more embodiments of the invention, the messages of the stream are displayed in reverse chronological order, while the messages of the content grouping are displayed in chronological order of their respective posting times.

In one or more embodiments of the invention, the client (105) includes functionality to display the stream message and the previously broadcasted message(s) with a display element indicating a relationship between the messages. For example, the display element can be a vertical ellipsis, a vertical line, a tree, an arrow, or any other visual indication that the messages are part of a common conversation. The display element can also indicate a relationship between the messages.

Figure 8:

FIGS. 8-20 depict example user interfaces of a client application executing on a client computing device. The user interfaces display message streams associated with a user account. In the example of FIG. 8, a context message from a followed account is added to a stream of a following account by a conversation module of a server. The conversation module determines that the context message is part of a conversation graph, and proceeds to identify a relevant conversation by selecting messages from the conversation graph. The conversation module then selects two ancestor messages of the relevant conversation to include in the stream of the user in conjunction with the context message. The conversation module sends the stream of messages to a client application executing on a client device. The client application displays the selected relevant messages (802) from the relevant conversation in the stream along with a selectable link (801) (i.e., a display element). In this example, upon selecting the link (801), the client application expands the branch of the relevant conversation to display additional messages between the displayed messages.

Figure 9:

In the example of FIG. 9, a display element (903) is shown indicating that a bottom message is a reply message below a top message of a set of relevant messages (904) from a relevant conversation. In this example, another display element (902) indicates a number of reply messages posted in response to a single relevant message of the relevant conversation. Furthermore, a horizontal "facepile" display element (901) displays indications (in this example, avatars) of authoring accounts of ancestor messages of the relevant conversation.

Figure 10:

In the example of FIG. 10, multiple display elements (1001, 1002, 1003) indicating relationships between messages (1004) of a relevant conversation. This example also includes a horizontal facepile display element as well as a link to view the entire conversation (i.e., "View full conversation").

Figure 11:
Figure 12:
Figure 13:
Figure 14:
Figure 19:
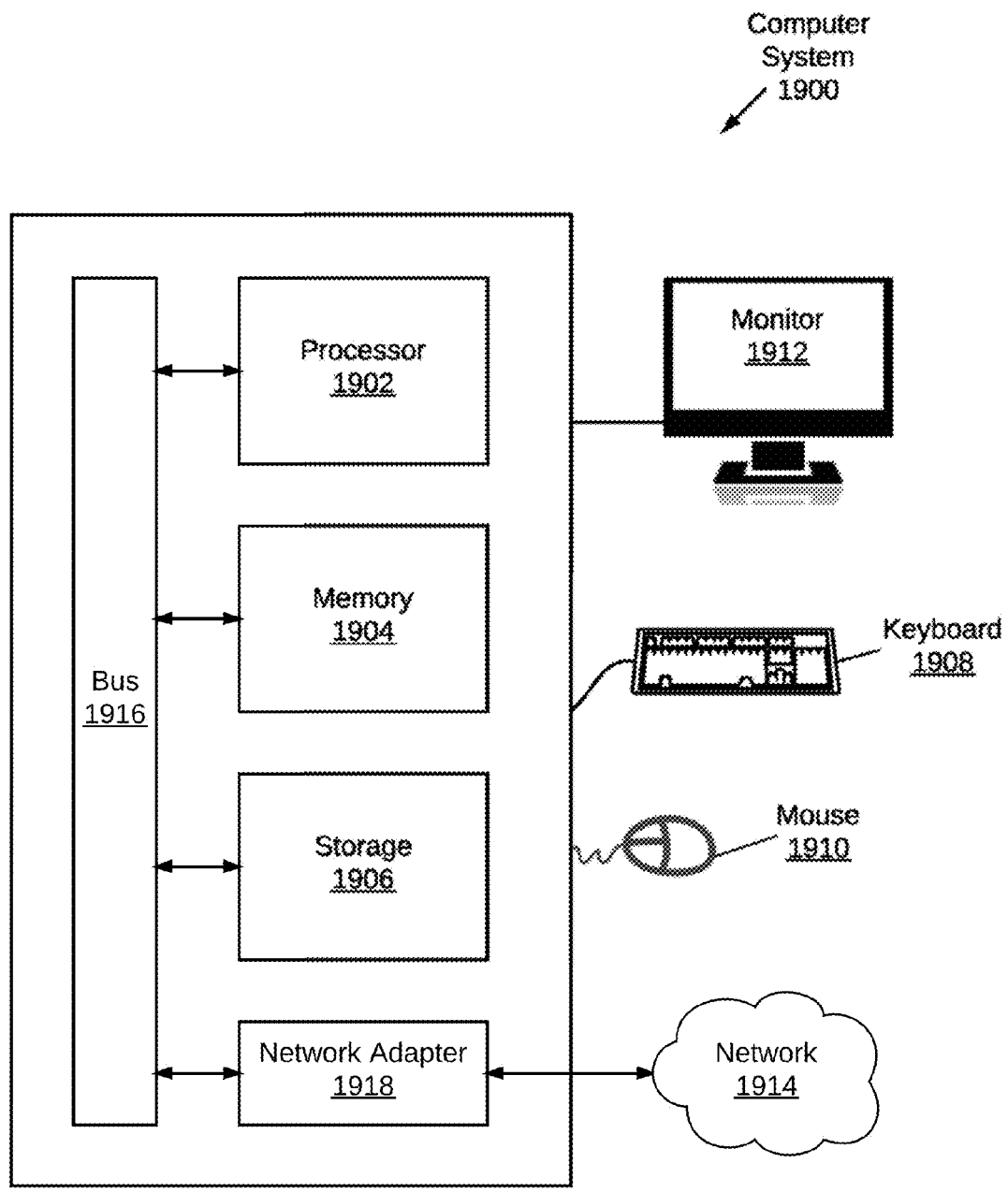
FIG. 19 depicts a high-level block diagram of a computer for identifying relevant and/or displaying messages of a conversation graph, in accordance with one or more embodiments of the invention.

In the example of FIG. 11, a first display element (1101) includes a vertical ellipsis indicating that one or more additional ancestor messages are present in the branch of the relevant conversation above a displayed messages. A second display element (1102) includes a vertical line indicating that no additional messages are present in the branch of the relevant conversation between two displayed messages. This example includes a grouping of content (1103) associated with parts of a relevant conversation. In the example of FIG. 12, a grouping of content (1201) associated with parts of a relevant conversation includes a display element (1202) next to a vertical ellipsis indicating that additional messages are present. The display element (1202) is selectable to trigger an animation which expands the grouping of content (1201) to display the additional messages. In this example, the author of the context message (shown at the bottom of the set of relevant messages (1201)) is followed by the following account while the authoring account of the other two messages displayed above the context message is not followed by the following account. Nonetheless, these messages are displayed by the client application due to their inclusion in the relevant conversation. FIGS. 13 and 14 depict examples of the display elements and functionality discussed above while scrolling through the user's stream of messages. The upper example of FIG. 15 depicts the use of indentation to illustrate relationships among relevant messages of a relevant conversation. The lower example of FIG. 15 depicts relevant messages displayed in chronological order while a most recent is displayed more prominently (i.e., with a larger avatar and text).

In the upper example of FIG. 16, a selectable user interface provides access to branches of a relevant conversation below a root message. In the lower example of FIG. 16, the "facepile" section depicts avatars of authoring accounts of messages of a conversation graph. This section includes a horizontal series of avatars depicting the authoring accounts, beginning with the authoring account of the root message. The facepile example in this depiction includes an ellipsis separating the avatar of the root account from those of authoring accounts of other relevant messages of the conversation. FIGS. 17 and 18 show additional variations in accordance with various embodiments of the invention.

In one or more embodiments of the invention, the client (105) is a computing device used to view one or more messages of the messaging platform (100). The client (105) may be configured to download one or more relevant conversations or message streams including any number of broadcast messages from the frontend module (110). The client (105) can then render the broadcast messages for display to a user. The client (105) can be configured to render the messages for display using a web browser, a mobile application, or any other client application, in accordance with various embodiments of the invention.

In one or more embodiments of the invention, the client (105) can be any computing device capable of rendering one or more broadcast messages for display to a user. Examples of a client (105) can include, but are not limited to, a laptop computer, a desktop computer, a server computer, a netbook, a tablet computer, and any other computing device having communication capability with the messaging platform (100). The client (105) can utilize any of a number of advantageous interfaces, including a web-based client, a Short Messaging Service (SMS) interface, an instant messaging interface, an email-based interface, an API function-based interface, and etc. to communicate (via a computer network) with one or more components of the messaging platform (100).

In one or more embodiments of the invention, one or more of the data repositories (message repository 140, connection graph repository 142, stream repository 144, account repository 146, and conversation repository 148) is a database and/ or storage service residing on one or more servers. For example, one or more of the data repositories may be implemented as a storage service using service-oriented architecture (SOA) and configured to receive requests for data and to provide requested data to other components of the messaging platform (100). In another example, message repository 140 may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository 140, connection graph repository 142, stream repository 144, account repository 146, and conversation repository 148) is a separate application or series of applications residing on one or more servers external (and communicatively coupled) to the messaging platform (100). Alternatively, in one or more embodiments of the invention, one or more of the data repositories may be an integrated component of the messaging platform (100) and/or may reside, either partially or entirely, on one or more common hardware devices (e.g., a server).

In one or more embodiments of the invention, routing module 125 includes functionality to receive one or more messages and to store the messages in message repository 140. Routing module 125 may be configured to assign an identifier to the message and to notify graph fanout module 130 of a sender of the message.

In one or more embodiments of the invention, graph fanout module 130 includes functionality to retrieve graph data from connection graph repository 142 and to use the graph data to determine which accounts in messaging platform 100 should receive the message. The graph data, for example, can reflect which accounts in the messaging platform are "following" a particular account and are, therefore, subscribed to receive status messages from the particular account.

In one or more embodiments of the invention, the delivery module 135 includes functionality to receive a list of accounts from graph fanout module 130 and the message identifier generated by routing module 125 and to insert the message identifier into stream data associated with each identified account. The delivery module 135 may then store the message list in stream repository 144. The stream data stored in stream repository 144 can make up one or more streams associated with one or more accounts of messaging platform 100. A stream may be a dynamic list of messages associated with one or more accounts or can reflect any arbitrary organization of messages that is advantageous for the user of an account. Message repository 140 can be used to generate message streams comprising lists of messages for presentation to a user based on various criteria. For example, a message stream can contain a list of messages from accounts that a particular account is associated with (e.g., following, friends with, etc.). Message stream data, in one or more embodiments, is stored in stream repository 144.

In one or more embodiments of the invention, frontend module 110 is a software application or a series of related software applications configured to communicate with external entities (e.g., client 105). Frontend module 110 may include an application programming interface (API 112) and/ or any number of other components used for communicating with entities outside of messaging platform 100. The API (112) can include any number of specifications for making requests from and/or providing data to messaging platform

100. For example, a function provided by the API can provide broadcasted messages to a consumer client (e.g., client 105).

In one or more embodiments of the invention, frontend module 110 is configured to use one or more of the data repositories (e.g., message repository 140, connection graph repository 142, stream repository 144, and/or account repository 146 to define streams for serving messages (i.e., stream data) to a user of the account on messaging platform 100. A user can use any client (e.g., client 105) to receive the messages. For example, where the user uses a web-based client to access to messaging platform 100, an API of frontend module 110 can be utilized to define one or more streams and/or to serve the stream data to the client for presentation to the user. Similarly, different forms of message delivery can be handled by different modules in frontend module 110. In one or more embodiments of the invention, the user can specify particular receipt preferences which are implemented by frontend module 110.

Figure 5:
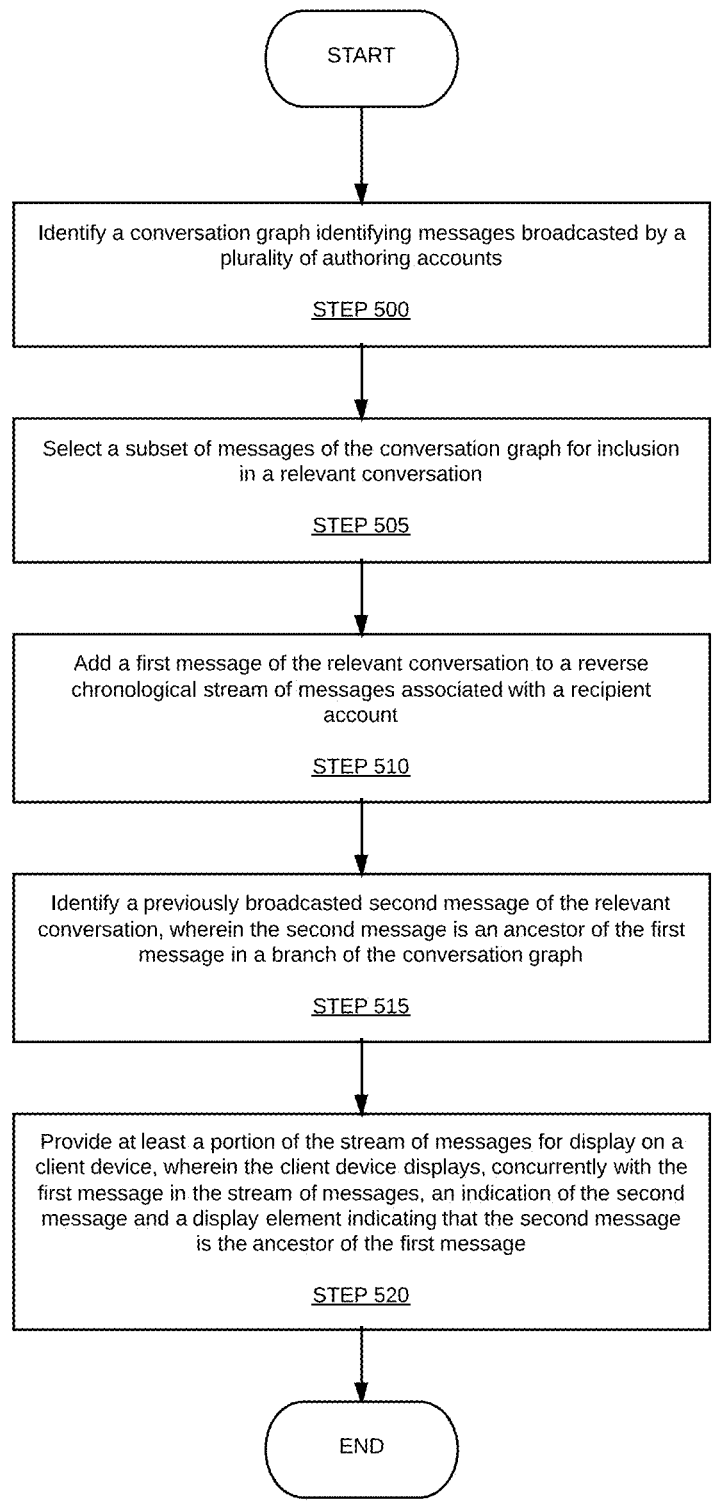
FIGS. 5 and 6 depict flowcharts of methods for identifying relevant messages, in accordance with one or more embodiments of the invention.
Figure 6:
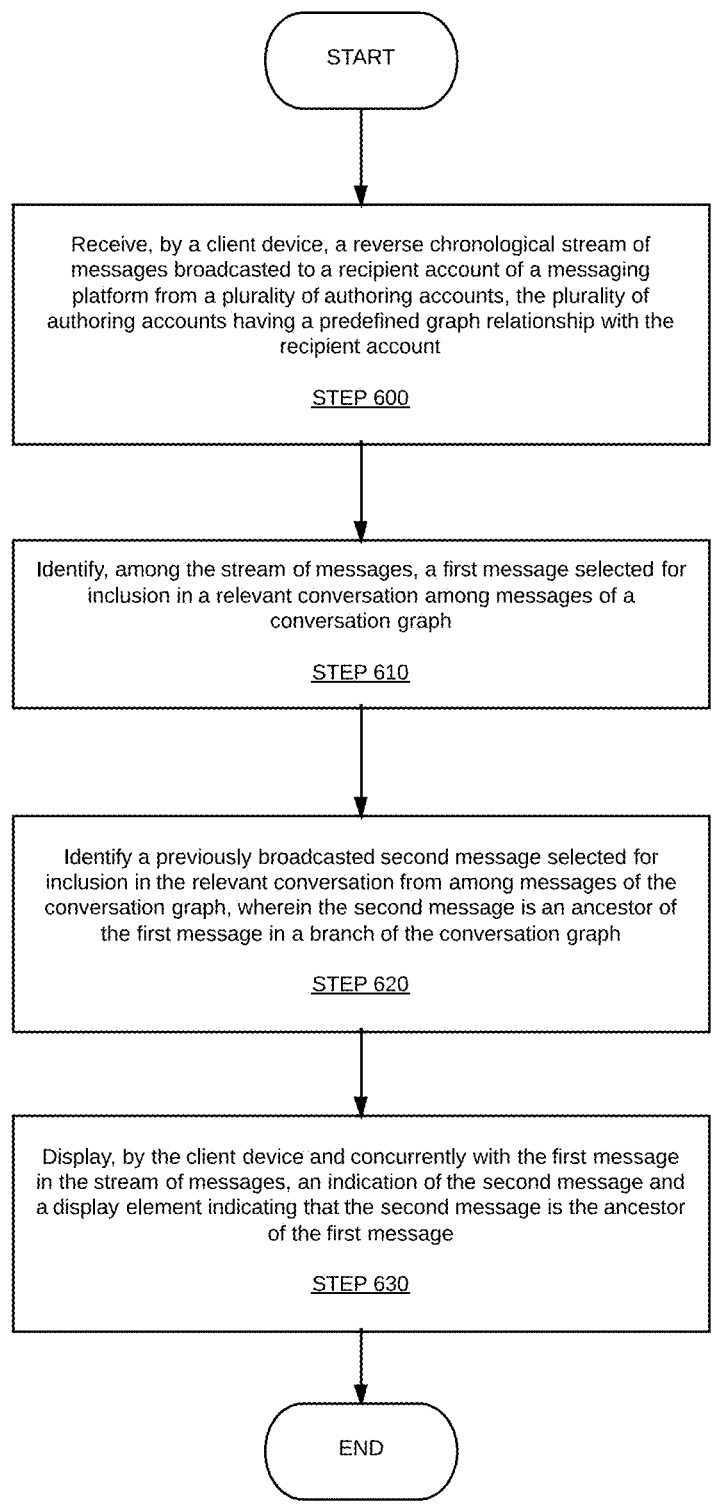
Figure 7A:
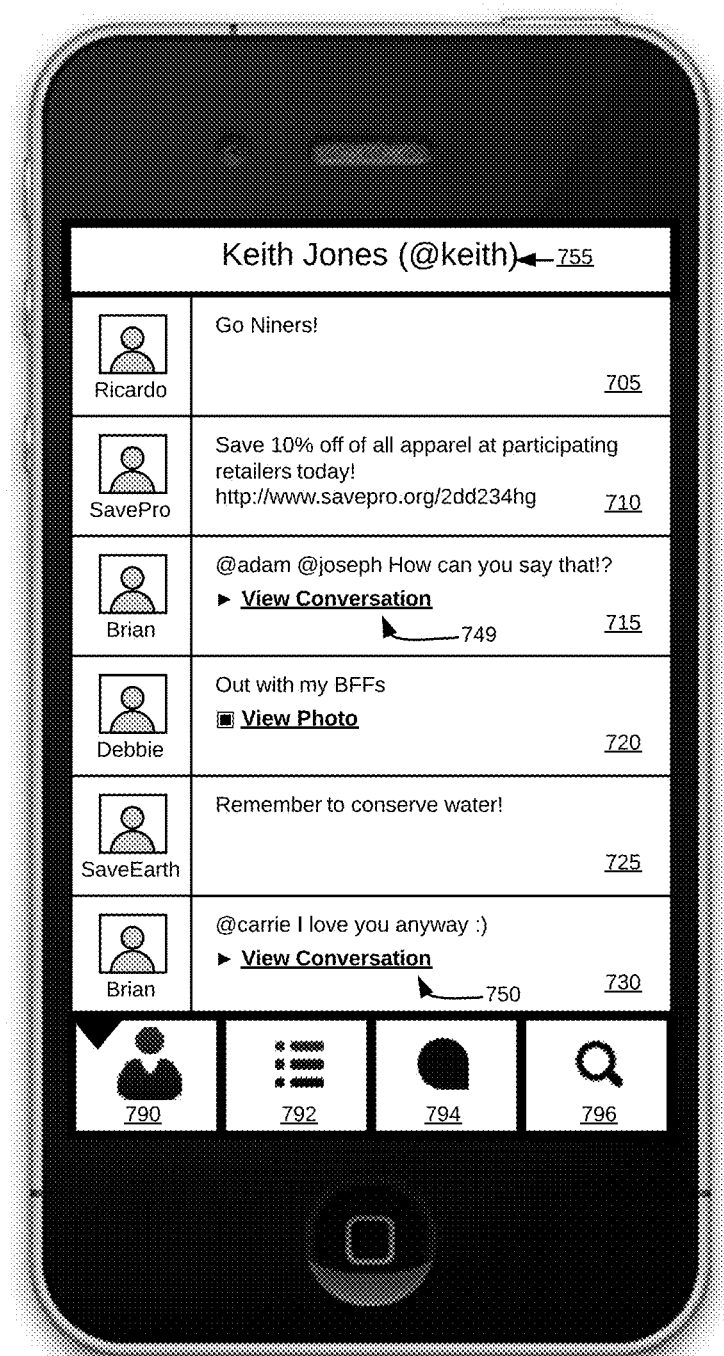
Figure 7B:

FIGS. 5 and 6 show flowcharts of methods for displaying messages of a relevant conversation. While the various steps in the flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 5 and 6 should not be construed as limiting the scope of the invention. In one or more embodiments, the steps of FIG. 5 can be performed by a conversation module (e.g., of conversation module (120) FIG. 1, discussed above) and the steps of FIG. 6 can be performed by a client application executing on a client device (e.g., of client (105) FIG. 1, discussed above).

In one or more embodiments of the invention, one or more steps of the flowcharts are repeated concurrently by multiple threads. Thus, one or more of the steps can be performed serially, in parallel, and/or by a distributed system, in accordance with various embodiments of the invention.

The following section describes various additional examples of the invention. The examples are included to aid in the understanding of the invention but are not intended to limit the scope of the invention.

FIG. 8A depicts example user interface of a mobile device (899) according to one embodiment in which messages are displayed to a user. The particular account for which the user interface is displaying messages is identified by account field 855. Icons depicted at a bottom of the user interface (i.e., 890, 892, 894, and 896) pertain to functions a user can select. Home stream icon 890 can be selected (e.g., by touching a touchscreen over the icon) in order to display a home stream of messages. Settings icon 892 can be selected in order to display a menu of account settings. Messages icon 894 can be selected in order to display private messages (i.e., direct messages) between the account and one or more other accounts. Search icon 896 can be selected in order to search messages based on various user selected criteria.

In the example of FIG. 6A, a home stream of messages is displayed by default. The home stream displays a live feed of messages posted by accounts followed by the user "@keith". Messages 815 and 830 are displayed in the home stream based on account "@keith" following the account "@brian" as shown in table 400 of FIG. 4. Messages 805, 810, 820, and 825 are also displayed in the home stream based on account "@keith" additionally following the accounts "@ricardo", "@savepro", "@debbie", and "@saveearth" (not shown in FIG. 4). The author of each message, in one embodiment, is identified by the author's avatar followed by the author's account ID, which is case insensitive in the current example. Messages 815 and 830 each contain a "View Conversation" link (849, 850) which, in this example, is a hyperlink which indicates that relevant messages including the corresponding message can be viewed by selecting the hyperlink.

As depicted in FIG. 8A, messages 815 and 830 are from account "@brian". Message 815 is from account "@brian" and is directed to accounts "@adam" and "@joseph" and includes the text "@adam @joseph How can you say that!?". Message 830 is from account "@brian" and is directed to account "@carrie" and includes the text "@Carrie I love you anyway." In this example, other relevant messages which are part of the conversation are not displayed in the home stream because they are posted by accounts which are not followed by account "@keith". In addition, messages which do not pertain to the conversation are also displayed in the home stream (i.e., messages 805, 810, 820, 825).

Messages 815 and 830 may appear to not make sense and may not provide a user reading the messages with a complete understanding of the interaction. Further, messages 805, 810, 820, and 825 can further confuse a reader since these messages are interspersed between messages 815 and 830 and are not related to the conversation. Hyperlink 849 in message 815 indicates that there may be more messages in the conversation which are not included in the current stream, or are dispersed throughout the stream. In this example, messages 815 and 830 of FIG. 8A are depicted as messages 204 and 212 in conversation graph 299 of FIG. 2.

Continuing the example, the user selects hyperlink 849 in message 815 in order to view relevant messages. Based on the user's selection of hyperlink 849, message 815 is identified as the context message. Since message 815 corresponds to message 204 of FIG. 2, message 204 is marked as relevant based on its selection as the context message. An application programming interface (API) call is made to the messaging platform requesting 5 messages of a relevant conversation. The API call includes an identifier of the context message.

A conversation module of the messaging platform then obtains a master conversation graph (depicted by FIG. 2) and begins by pruning all branches of the graph not including the context message. Thus, in this example, message 206 of FIG. 2 is removed from the graph for purposes of the analysis. The conversation module then creates a relevance score for each authoring account of the conversation graph. The relevance scores are initialized to zero, as shown in the following table:

| Authoring Account | Relevance Score |
|---|---|
| @adam | 0 |
| @joseph | 0 |
| @david | 0 |
| @carrie | 0 |
| @john | 0 |
| @ashish | 0 |

Continuing the example, the conversation module applies a series of relevance filters to the conversation graph in a predefined sequence, in order to modify the relevance scores. In this example, the authoring account of the context message is automatically included in the relevant conversation, and is therefore not scored.

In applying the first relevance filter, the conversation module identifies a credibility rating of each authoring account of the conversation graph. All accounts having a credibility rating above 1000 points get a +1 increase in their relevance scores. The following depicts the relevance scores at this point in the example:

| Authoring Account | Relevance Score |
| --- | --- |
| @adam | 1 |
| @joseph | 0 |
| @david | 1 |
| @carrie | 1 |
| @john | 0 |
| @ashish | 0 |

The conversation module then applies a second relevance filter. Applying the second relevance filter involves identifying a whitelist of verified users. The conversation graph compares each of the authoring accounts of the conversation graph to the whitelist, and if the authoring account is determined to be verified (i.e., found in the whitelist), then the conversation graph increases the relevance score of that account by +5 points. In this example, "@joseph" and "@carrie" are identified as a verified account. The following depicts the relevance scores at this point in the example:

| Authoring Account | Relevance Score |
| --- | --- |
| @adam | 1 |
| @joseph | 5 |
| @david | 1 |
| @carrie | 6 |
| @john | 0 |
| @ashish | 0 |

Continuing the example, the conversation module then applies a third relevance filter. Applying the third relevance filter involves identifying accounts followed by the requesting account (i.e., "@keith"). As represented by the account data table (400) of FIG. 4, the account "@keith" follows only the account "@brian", which is not represented by a relevance score. Accordingly, the relevance scores are not modified.

Continuing the example, the conversation module then applies a fourth relevance filter. Applying the fourth relevance filter involves designating the authoring account of the context message (i.e., "@brian") and the authoring account of the root message (i.e., "@adam") as blessed. Then, the conversation module identifies all messages replied to by blessed authoring accounts and, in turn, designates the authoring accounts of the replied to messages as blessed. This process continues until convergence. In this example, all blessed authoring accounts receive an increase in their corresponding relevance score of +2. The following depicts the relevance scores at this point in the example:

| Authoring Account | Relevance Score |
| --- | --- |
| @adam | 3 |
| @joseph | 7 |
| @david | 1 |
| @carrie | 8 |
| @john | 0 |
| @ashish | 0 |

At this point, the conversation module selects the smallest subset of the highest ranking authors which have, in aggregate, at least 3 messages in the conversation graph. Only 3 messages are required due to the author of the context message, "@brian" being included in the result set by default. Since "@brian" has two messages in the conversation graph, an additional 3 messages are required.

In this example, the conversation module first includes "@carrie" in the relevant conversation due to her highest relevance score of 8. Carrie has only 1 message in the conversation graph (i.e., less than 4), and so the conversation module proceeds to select the next highest relevance score. In this example, "@joseph" has the next highest relevance score and is therefore selected for inclusion in the relevant conversation. After including "@joseph", the relevant conversation includes 2 messages. The conversation module determines that at least 1 more message is required and, thus, selects the next highest relevance scoring account, "@adam", for inclusion in the relevant conversation. At this point the relevant conversation includes messages 835, 840, 815, 845, and 830 of FIG. 8B which correspond to messages 200, 202, 204, 208, and 212 shown in FIG. 2.

FIG. 8B depicts an example user interface of the mobile device (899) which displays the relevant conversation including messages 835, 840, 815, 845, and 830 in response to selection of hyperlink 849 in message 815 of FIG. 8A. The messages displayed in FIG. 8A are based on accounts "Keith" (i.e., account "@keith") follows, while the messages displayed in FIG. 8B are messages included in the relevant conversation generated based on an embodiment of the method depicted in FIG. 7 (discussed above). As depicted in FIG. 8B, messages 815 and 830 are augmented by the display of messages 835, 840, and 845. Since messages determined to be part of the relevant conversation are depicted in FIG. 8B, the user associated with the account "@keith" can gain a better understanding of the exchange.

Embodiments of the invention may be implemented on virtually any type of computer regardless of the platform being used. For example, as shown in FIG. 9, a computer system (900) includes one or more processor(s) (902) (such as a central processing unit (CPU), integrated circuit, hardware processor, etc.), associated memory (904) (e.g., RAM, cache memory, flash memory, etc.), a storage device (906) (e.g., a hard disk, an optical drive such as a compact disk drive or digital video disk (DVD) drive, a flash memory stick, etc.), a network adapter (918), and numerous other elements and functionalities typical of today's computers (not shown). One or more components of computer system 900 may be communicatively connected by a bus (916). Computer system 900 may also include input means, such as a keyboard (908), a mouse (910), or a microphone (not shown). Further, computer system 900 may include output means, such as a monitor (912) (e.g., a liquid crystal display (LCD), a plasma display, or cathode ray tube (CRT) monitor). Computer system 900 may be connected to a network (914) (e.g., a local area network (LAN), a wide area network (WAN) such as the Internet, or any other type of network) via network adapter 918. Those skilled in the art will appreciate that many different types of computer systems exist, and the aforementioned input and output means may take other forms. Generally speaking, computer system 900 includes at least the minimal processing, input, and/or output means necessary to practice embodiments of the invention.

Further, in one or more embodiments of the invention, one or more elements of the aforementioned computer system (900) may be located at a remote location and connected to the other elements over a network. Further, embodiments of the invention may be implemented on a distributed system having a plurality of nodes, where each portion of the invention (e.g., conversation module 120, semantic analysis module 122, frontend module 110, routing module 125, etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a flash memory device, a solid state drive, a primary storage device, or any other tangible computer readable storage device.

One or more embodiments of the invention have one or more of the following advantages. By identifying relevant messages of a conversation graph and providing the relevant messages to a client, it may be possible to provide a concise and relevant view of a conversation to a user. Thus, in one or more embodiments, the user can be spared from viewing less relevant messages, and can view a relevant subset of a relevant conversation including messages from a variety of different accounts based on context data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a relevant conversation, comprising:
   identifying a conversation graph identifying messages broadcasted by a plurality of authoring accounts; selecting a subset of messages of the conversation graph for inclusion in a relevant conversation;
   adding, by a computer processor, a first message of the relevant conversation to a reverse chronological stream of messages associated with a recipient account;
   identifying, by the computer processor, a previously broadcasted second message of the relevant conversation, wherein the second message is an ancestor of the first message in a branch of the conversation graph; and
   providing at least a portion of the stream of messages for display on a client device, wherein the client device displays, concurrently with the first message in the stream of messages, an indication of the second message and a display element indicating that the second message is the ancestor of the first message.

2. The method of claim 1, further comprising:
   detecting a user selection of the display element; and
   identifying a set of messages between the first message and the second message in the branch of the relevant conversation, wherein the client device expands a portion of the stream comprising the display element to display the set of messages.

3. The method of claim 2, wherein the client device displays an animation of the stream expanding to display the set of messages.

4. The method of claim 1, further comprising:
   receiving a request to broadcast the first message;
   in response to identifying the previously broadcasted second message:
      linking the second message with the first message, and removing the second message from an original location in the reverse chronological stream of messages, wherein the original location corresponds to an original broadcast time of the second message.

5. The method of claim 1, wherein selecting the subset of messages of the conversation graph for inclusion in the relevant conversation comprises:
   calculating relevance scores each corresponding to an authoring account of the plurality of authoring accounts; and
   selecting messages of the conversation graph having a highest set of the relevance scores for inclusion in the relevant conversation.

6. The method of claim 1, wherein the recipient account has a predefined graph relationship with the authoring account of the first message, and wherein an authoring account of the second message is outside of the predefined graph relationship.

7. The method of claim 1, wherein the second message is one selected from a group consisting of a root message of the conversation graph and a context message of the conversation graph associated with a request.

8. The method of claim 1, wherein the first message is an indirect reply to the second message.

9. The method of claim 1, wherein the display element is one selected from a group consisting of a vertical ellipsis, a vertical line, a tree, and an arrow.

10. A method for displaying a relevant conversation, comprising:
    receiving, by a client device, a reverse chronological stream of messages broadcasted to a recipient account of a messaging platform from a plurality of authoring accounts, the plurality of authoring accounts having a predefined graph relationship with the recipient account;
    identifying, among the stream of messages, a first message selected for inclusion in a relevant conversation among messages of a conversation graph;
    identifying a previously broadcasted second message selected for inclusion in the relevant conversation from among messages of the conversation graph, wherein the second message is an ancestor of the first message in a branch of the conversation graph; and
    displaying, by the client device and concurrently with the first message in the stream of messages, an indication of the second message and a display element indicating that the second message is the ancestor of the first message.

11. The method of claim 10, further comprising:
    detecting, by the client computing device, a user selection of the display element; and
    expanding, by the client computing device, a portion of the stream comprising the display element to display a set of messages between the first message and the second message in the branch of the relevant conversation.

12. The method of claim 10, further comprising:
    after identifying the previously broadcasted second message:
       removing the second message from an original location in the reverse chronological stream of messages, wherein the original location corresponds to an original broadcast time of the second message.

13. The method of claim 10, wherein the first message and the second message are selected for inclusion in the relevant conversation based at least on a relevance score of an authoring account of the first message and a relevance score of an authoring account of the second message.

14. The method of claim 10, wherein an authoring account of the second message is outside of the predefined graph relationship.

15. The method of claim 10, wherein the display element is one selected from a group consisting of a vertical ellipsis, a vertical line, a tree, and an arrow.

16. A client computing device, comprising:
a computer processor; and
a memory comprising a client application configured to execute on the computer processor to enable the computer processor to:
   receive a reverse chronological stream of messages broadcasted to an account of a messaging platform from a plurality of authoring accounts, the plurality of authoring accounts having a predefined graph relationship with the account;
identify, among the stream of messages, a first message selected for inclusion in a relevant conversation among messages of a conversation graph;
   identify a previously broadcasted second message selected for inclusion in the relevant conversation from among messages of the conversation graph, wherein the second message is an ancestor of the first message in a branch of the conversation graph; and
   display, concurrently with the first message in the stream of messages, an indication of the second message and a display element indicating that the second message is the ancestor of the first message.

17. The client computing device of claim 16, wherein the client application is further configured to execute on the computer processor to enable the computer processor to:
detect a user selection of the display element; and
expand a portion of the stream comprising the display element to display a set of messages between the first message and the second message in the branch of the relevant conversation.

18. The client computing device of claim 17, wherein the client application is further configured to execute on the computer processor to enable the computer processor to:
display an animation of the stream expanding to display the set of messages.

19. The client computing device of claim 1, wherein the client application is further configured to execute on the computer processor to enable the computer processor to:
remove the second message from an original location in the reverse chronological stream of messages after identifying the previously broadcasted second message.

20. The client computing device of claim 16, wherein an authoring account of the second message is outside of the predefined graph relationship.

21. A non-transitory computer readable medium comprising a plurality of instructions for identifying a relevant conversation, the plurality of instructions, when executed by a computer processor, comprising functionality to:
identifying a conversation graph identifying messages broadcasted by a plurality of authoring accounts; selecting a subset of messages of the conversation graph for inclusion in a relevant conversation;
adding, by a computer processor, a first message of the relevant conversation to a reverse chronological stream of messages associated with a recipient account;
identifying, by the computer processor, a previously broadcasted second message of the relevant conversation, wherein the second message is an ancestor of the first message in a branch of the conversation graph; and
providing at least a portion of the stream of messages for display on a client device, wherein the client device displays, concurrently with the first message in the stream of messages, an indication of the second message and a display element indicating that the second message is the ancestor of the first message.

22. The non-transitory computer readable medium of claim 21, wherein the instructions further comprise:
receiving a request to broadcast the first message;
in response to identifying the previously broadcasted second message:
   linking the second message with the first message, and removing the second message from an original location in the reverse chronological stream of messages, wherein the original location corresponds to an original broadcast time of the second message.

23. The non-transitory computer readable medium of claim 21, wherein the recipient account has a predefined graph relationship with the authoring account of the first message, and wherein an authoring account of the second message is outside of the predefined graph relationship.

24. The non-transitory computer readable medium of claim 21, wherein the first message is an indirect reply to the second message.

* * * * *